US010241709B2

(12) United States Patent
Scales et al.

(10) Patent No.: US 10,241,709 B2
(45) Date of Patent: Mar. 26, 2019

(54) ELASTIC TEMPORARY FILESYSTEM

(71) Applicant: VMware, Inc., Palo Alto, CA (US)

(72) Inventors: Daniel J. Scales, Mountain View, CA (US); Tariq Magdon-Ismail, San Jose, CA (US); Razvan Cheveresan, Palo Alto, CA (US); Michael Nelson, Alamo, CA (US); Richard McDougall, Menlo Park, CA (US)

(73) Assignee: VMware, Inc., Palo Alto, CA (US)

( * ) Notice: Subject to any disclaimer, the term of this patent is extended or adjusted under 35 U.S.C. 154(b) by 56 days.

(21) Appl. No.: 14/517,301

(22) Filed: Oct. 17, 2014

(65) Prior Publication Data

US 2015/0160884 A1 Jun. 11, 2015

Related U.S. Application Data

(60) Provisional application No. 61/913,494, filed on Dec. 9, 2013.

(51) Int. Cl.
*G06F 3/06* (2006.01)
*G06F 17/30* (2006.01)

(52) U.S. Cl.
CPC ............ *G06F 3/0644* (2013.01); *G06F 3/067* (2013.01); *G06F 3/0608* (2013.01); *G06F 3/0665* (2013.01); *G06F 3/0667* (2013.01); *G06F 17/30067* (2013.01)

(58) Field of Classification Search
None
See application file for complete search history.

(56) References Cited

U.S. PATENT DOCUMENTS

| 6,067,599 | A | * | 5/2000 | Kishi | G06F 12/0804 |
| | | | | | 707/999.202 |
| 9,256,456 | B1 | * | 2/2016 | Aron | G06F 9/45533 |
| 2004/0260861 | A1 | * | 12/2004 | Serizawa | G06F 3/0608 |
| | | | | | 711/4 |
| 2010/0115229 | A1 | * | 5/2010 | Thelen | G06F 12/1027 |
| | | | | | 711/207 |
| 2012/0137062 | A1 | * | 5/2012 | Arges | G06F 9/45558 |
| | | | | | 711/113 |
| 2012/0167080 | A1 | * | 6/2012 | Vilayannur | G06F 3/0608 |
| | | | | | 718/1 |
| 2013/0339958 | A1 | * | 12/2013 | Droste | G06F 21/41 |
| | | | | | 718/1 |

(Continued)

*Primary Examiner* — Sean D Rossiter
*Assistant Examiner* — Charles J Choi
(74) *Attorney, Agent, or Firm* — Patterson & Sheridan, LLP (57) ABSTRACT

An elastic filesystem for temporary data provides storage space for virtual machines (VMs) in a distributed computing system. The filesystem redirects accesses to virtual disks in VMs to a common pool file. The system provides performance and storage efficiency at least on par with local, direct attached virtual disks, while providing a single pool of shared storage that is provisioned and managed independently of the VMs. The system provides storage isolation between VMs storing temporary data in that shared pool. Also, storage space for temporary data may be allocated on demand and reclaimed when no longer needed, thereby supporting a wide variety of temporary space requirements for different Hadoop jobs.

20 Claims, 4 Drawing Sheets

(56) References Cited

U.S. PATENT DOCUMENTS

2014/0201451 A1* 7/2014 Dube ............... G06F 12/084
  711/130
2014/0237147 A1* 8/2014 Joshi ............... G06F 12/0866
  710/74

* cited by examiner

ELASTIC TEMPORARY FILESYSTEM

CROSS-REFERENCE TO RELATED APPLICATION(S)

This application claims the benefit of U.S. Provisional Patent Application No. 61/913,494, filed Dec. 9, 2013, the entire contents of which are incorporated by reference herein.

BACKGROUND

Distributed computing platforms, such as Hadoop or other MapReduce-related frameworks, include software that allocates computing tasks across a group, or "cluster," of distributed software components executed by a plurality of computing devices, enabling large workloads (e.g., data sets) to be processed in parallel and more quickly than is generally feasible with a single software instance or a single device. Such distributed computing platforms typically utilize a distributed file system that can support input/output-intensive distributed software components running on a large quantity (e.g., on the order of thousands) of computing devices to access a large quantity (e.g., petabytes) of data. For example, a data set to be analyzed by Hadoop may be stored within a Hadoop Distributed File System (HDFS) that is typically used in conjunction with Hadoop, which enables various computing devices running Hadoop software to simultaneously process different portions of the file.

DETAILED DESCRIPTION

One common approach to virtualizing Hadoop has been to perform a physical-to-virtual (P2V) migration where the physical deployment is directly cloned into virtual machines. However, there are several drawbacks that make this approach less desirable for distributed computing applications such as Hadoop. The first has to do with elasticity. Adding and removing Hadoop nodes to increase and decrease compute resources available to jobs may be a cumbersome, coarse grained activity due to the traditional tight coupling between the compute runtime and data storage layers. Such coupling makes it difficult to dynamically scale the virtual cluster to either make use of spare physical capacity or relinquish it to another workload. To make the Hadoop cluster elastic, the compute layer may be separated from the storage layer so that each can be independently provisioned and scaled. This level of flexibility enables Hadoop to more efficiently share resources with other workloads and consequently raise the utilization of the underlying physical infrastructure. Moreover, the separate architecture allows for more efficient hosting of multiple tenants, with their own private virtual clusters, which goes beyond the level of multi-tenancy offered by Hadoop's built-in scheduler and security controls by relying on the hypervisor for much stronger VM-level security and resource isolation guarantees. Further, since each compute cluster may be independent, each tenant could have their own version of the Hadoop runtime. Such characteristics described above combine to form a flexible, elastic, and secure service, i.e., Hadoop-as-a-service.

Figure 1:
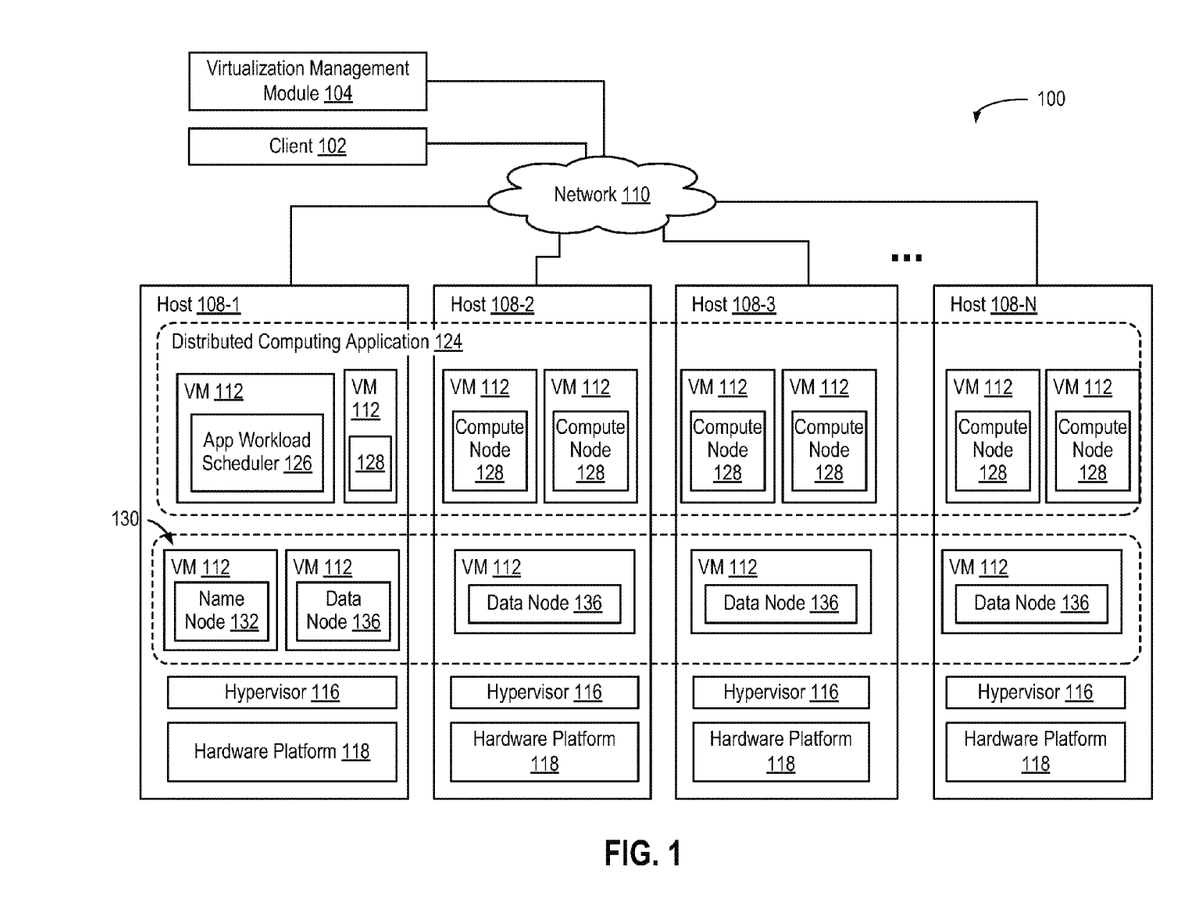
FIG. 1 is a block diagram that illustrates a virtualized computing system with which one or more embodiments of the present disclosure may be utilized.

FIG. 1 is a block diagram that illustrates a computing system 100 with which one or more embodiments of the present disclosure may be utilized. As illustrated, computing system 100 includes a plurality of host computers, identified as hosts 108-1, 108-2, 108-3, and 108-4, and referred to collectively as hosts 108. Each host 108 is configured to provide a virtualization layer that abstracts processor, memory, storage, and networking resources of a hardware platform 118 into multiple virtual machines (VMs) 112 that run concurrently on the same host 108. VMs 112 run on top of a software interface layer, referred to herein as a hypervisor 116, that enables sharing of the hardware resources of host 108 by the VMs 112. One example of hypervisor 116 that may be used in an embodiment described herein is a VMware ESXi hypervisor provided as part of the VMware vSphere solution made commercially available from VMware, Inc.

Computing system 100 may include a virtualization management module 104 that may communicate to the plurality of hosts 108 via network 110. In one embodiment, virtualization management module 104 is a computer program that resides and executes in a central server, which may reside in computing system 100, or alternatively, running as a VM in one of hosts 108. One example of a virtualization management module is the vCenter® Server product made available from VMware, Inc. Virtualization management module 104 is configured to carry out administrative tasks for the computing system 100, including managing hosts 108, managing VMs running within each host 108, provisioning VMs, migrating VMs from one host to another host, load balancing between hosts 108, creating resource pools comprised of computing resources of hosts 108 and VMs 112, modifying resource pools to allocate and de-allocate VMs and physical resources, and modifying configurations of resource pools. In one embodiment, virtualization management module 104 may issue commands to power on, power off, reset, clone, deploy, and provision one or more VMs 112 executing on a particular host 108. In one embodiment, virtualization management module 104 is configured to communicate with hosts 108 to collect performance data and generate performance metrics (e.g., counters, statistics) related to availability, status, and performance of hosts 108, VMs 112, and resource pools.

In one or more embodiments, VMs 112 of hosts 108 may be provisioned and used to execute a number of workloads that deliver information technology services, including web services, database services, data processing services, and directory services. In one embodiment, one or more VMs 112 are configured to serve as a node of a cluster generated and managed by a distributed computing application 124 configured to elastically distribute its workload over a plurality of VMs that acts as nodes of the distributed computing application. Distributed computing application 124 may be configured to incorporate additional VMs or releasing unused VMs from its cluster—thereby growing and shrinking its profile within computing system 100. VMs 112 executing as nodes of distributed computing application 124 are shown in greater detail in FIG. 2.

Figure 2:
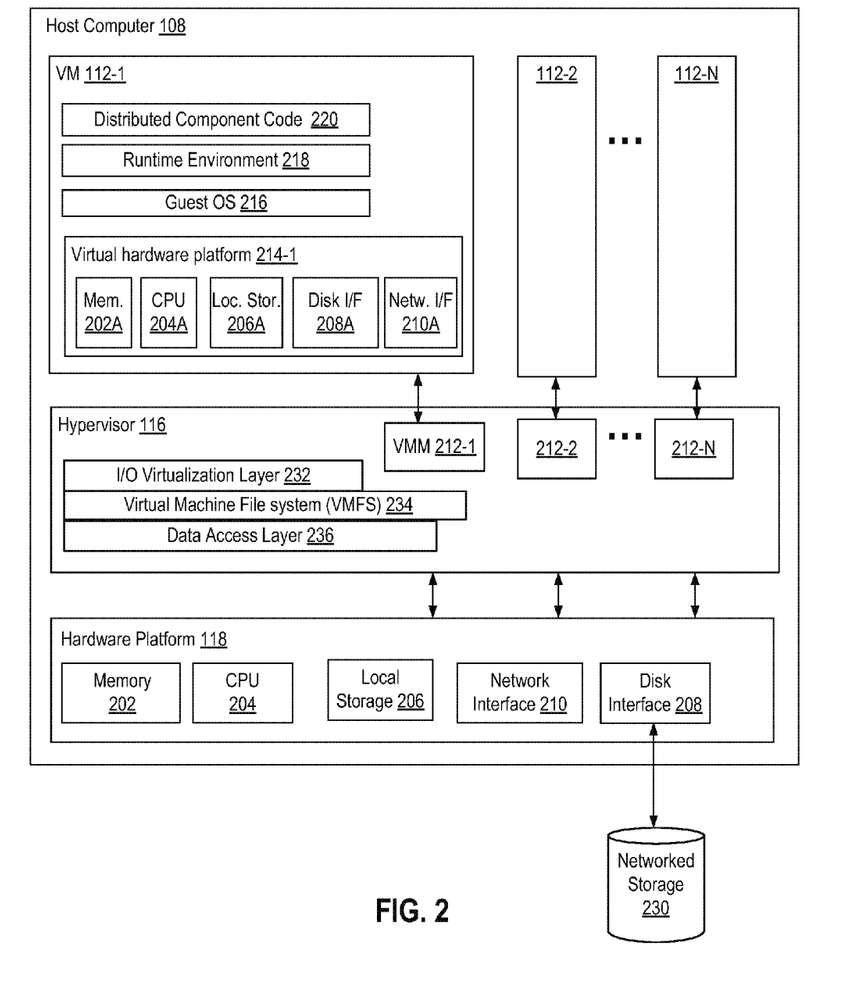
FIG. 2 is a block diagram that illustrates a host computer supporting one or more virtual machines, according to one embodiment of the present disclosure.

FIG. 2 is a block diagram that illustrates a host computer 108 supporting one or more virtual machines 112, according to one embodiment of the present disclosure. As shown, hardware platform 118 of each host 108 may include conventional components of a computing device, such as a memory 202, a processor 204, local storage 206, a disk interface 208, and a network interface 210. Processor 204 is configured to execute instructions, for example, executable instructions that perform one or more operations described herein and may be stored in memory 202 and in local storage 206. Memory 202 and local storage 206 are devices allowing information, such as executable instructions, cryptographic keys, virtual disks, configurations, and other data, to be stored and retrieved. Memory 202 may include, for example, one or more random access memory (RAM) modules; local storage 206 may include, for example, one or more hard disks, flash memory modules, solid state disks, and optical disks. Disk interface 208 enables host 108 to communicate with one or more network data storage systems that may, for example, store "virtual disks" that are accessed by VM nodes. Examples of disk interface 208 are a host bus adapter (HBA) that couples host 108 to a storage area network (SAN) or a network file system interface, depicted as networked storage 230. Network interface 210 enables host 108 to communicate with another device via a communication medium, such as network 110. An example of network interface 210 is a network adapter, also referred to as a Network Interface Card (NIC). In some embodiments, a plurality of NICs is included in network interface 210.

As described earlier, virtual machines (e.g., VMs 112-1 to 112-N) run on top of a hypervisor 116 that enables sharing of the resources of hardware platform 118 of host 108 by the virtual machines. Hypervisor 116 may run on top of the operating system of host 108 or directly on hardware components of host 108. Hypervisor 116 provides a device driver layer configured to map physical resource of hardware platforms 118 to "virtual" resources of each VM 112 such that each VM 112-1 to 112-N has its own corresponding virtual hardware platform (e.g., a corresponding one of virtual hardware platforms 214-1 to 214-N). Each such virtual hardware platform 214 provides emulated hardware (e.g., memory 202A, processor 204A, local storage 206A, disk interface 208A, network interface 210A, etc.) that may, for example, function as an equivalent, conventional hardware architecture for its corresponding VM 112. Virtual hardware platforms 214-1 to 214-N may be considered part of virtual machine monitors (VMMs) 212-1 to 212-N which implement virtual system support to coordinate operations between hypervisor 116 and corresponding VMs 112-1 to 112-N.

In the embodiment depicted in FIG. 2, each VM 112 includes a guest operating system (OS) 216 (e.g., Microsoft Windows, Linux) and one or more guest applications running on top of guest OS 216. In each instance, guest OS 216 includes a native file system layer, for example, either an NTFS or an ext3/ext4 type file system layer. These file system layers interface with virtual hardware platforms 214 to access, from the perspective of guest operating systems 216, a data storage HBA, which in reality, is virtual disk interface (HBA) 208A implemented by virtual hardware platform 214 that provides the appearance of disk storage support (in reality, virtual disks) to enable execution of guest OS 216 transparent to the virtualization of the system hardware. In certain embodiments, virtual disks (i.e., virtual local storage 206A) may appear to support, from the perspective of guest OS 216, the SCSI standard for connecting to the virtual machine or any other appropriate hardware connection interface standard known to those with ordinary skill in the art, including IDE, ATA, and ATAPI. Although, from the perspective of guest operating systems 216, file system calls initiated by such guest operating systems 216 to implement file system-related data transfer and control operations appear to be routed to virtual disks for final execution, in reality, such calls are processed and passed through virtual HBA 208A to adjunct virtual machine monitor (VMM) layers 212-1 to 212-N that implement the virtual system support needed to coordinate operation with hypervisor 106. In particular, a HBA emulator of each VMM 212 functionally enables the data transfer and control operations to be correctly handled by hypervisor 116 which ultimately passes such operations through its various layers to true hardware HBAs 208 or NIC 210 that connect to underlying storage systems.

In one embodiment, I/O virtualization layer 232 of hypervisor 116 receives a data transfer and control operation (in the form of I/O commands, for example, intended for a virtual disk) from VMM layers 212-1 to 212-N, and converts them into file system operations that are understood by virtual machine file system (VMFS) 234 in order to access a file stored in underlying storage under the management of VMFS 234 that represents the SCSI-compliant virtual disk. For example, assuming a SCSI-supported virtual device implementation (although those with ordinary skill in the art will recognize the option of using other hardware interface standards), I/O virtualization layer 232 may be a vSCSI layer that receives SCSI commands for data transfer and control intended for a SCSI-compliant virtual disk, and converts them into file system operations that are understood by VMFS 134 in order to access a file stored in local storage 206, or in other embodiments, networked storage 230. In one embodiment, the file representing the virtual disk conforms to the VMware Virtual Disk (VMDK) file format promulgated by VMware, Inc. for virtual disks, although it should be recognized that alternative virtual disk file formats may be used in other embodiments. I/O virtualization layer 232 then issues these file system operations to VMFS 234. VMFS 234, in general, manages creation, use, and deletion of files (e.g., such as .vmdk files representing virtual disks) stored on physical location of local storage 206, or in logical volumes or Logical Unit Numbers (LUNs) exposed by networked storage 230. VMFS 234 converts the file system operations received from I/O virtualization layer 232 to raw SCSI operations, which are issued to a data access layer 236 that applies command queuing and scheduling policies to the raw SCSI operations and ultimately sends the raw SCSI operations to components of the physical hardware platform 118.

It should be recognized that the various terms, layers and categorizations used to describe the virtualization components in FIG. 2 may be referred to differently without departing from their functionality or the spirit or scope of the invention. For example, VMMs 212 may be considered separate virtualization components between VMs 112 and hypervisor 116 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 214 may be merged with and into VMM 212 such that virtual host bus adapter 208A is removed from FIG. 2 (i.e., since its functionality is effectuated by a host bus adapter emulator within VMM 212).

In one embodiment, each VM 112 includes a runtime environment 218, such as a Java Virtual Machine (JVM), that supports execution of a distributed software component code 220 (e.g., Java code) for distributed computing application 124. For example, if distributed computing application 124 is a Hadoop application, a VM 112 may have a runtime environment 218 (e.g., JVM) that executes distributed software component code 220 implementing a workload scheduler function (sometimes referred to as "Job Tracker"), "Task Tracker" function, or "Name Node" function, "Data Node" function, described further below. In another example of a distributed computing application 124, a VM 112 may have a runtime environment 218 (e.g., JVM) that executes distributed software component code 220 implementing a "Resource Manager" function, "Application Master" function, "Node Manager" function, and "Container" function. Alternatively, each VM 112 may include distributed software component code 220 for distributed computing application 124 configured to run natively on top of guest OS 216.

Referring back to FIG. 1, in one embodiment, distributed computing application 124 may be an implementation of the MapReduce model, which is a distributed processing framework for large-scale data processing. MapReduce computations, referred to as jobs or applications, are broken into tasks that run in two phases—Map and Reduce. During the Map Phase, (Map) tasks read data from a distributed file system (in parallel) and perform their computations in parallel. At the end of the Map phase, the intermediate output (results of the computations) generated locally are sent to the Reduce phase (potentially remote) for aggregation or further processing, before the final results are written to the distributed file system. Hadoop is an open-source implementation of the MapReduce model, and may rely on a Hadoop Distributed File System (HDFS) for data storage.

In one embodiment, distributed computing application 124 includes an application workload scheduler 126 (e.g., executing in a VM 112) which accepts jobs from clients 102 and schedules corresponding workloads for execution on a plurality of compute nodes 128 that are associated with distributed computing application 124. In some implementations of Hadoop, application workload scheduler 126 may be referred to as a "JobTracker," or in other implementations, may have functionality split between a "Resource Manager" and an "Application Master." Each compute node 128, which may be executing as a VM 112, is a worker node that carries out tasks (e.g., map tasks, reduce tasks of a MapReduce job) provided by application workload scheduler 126. Each compute node 128 may handle multiple tasks in parallel. In one embodiment, a compute node 128 is configured to run one or more tasks in one or more available "slots" or "containers." In one example, each slot may be implemented as an instance of a runtime environment (e.g., Java Virtual Machine) executing distributed software component code (e.g., code 220) for completing a single task. As such, in some embodiments, each compute node 128 may execute multiple instances of the runtime environment to execute in parallel multiple tasks assigned to the compute node by the workload scheduler 126. In some implementations of Hadoop, compute nodes 128 may be referred to as "TaskTracker" nodes or "Node Managers." If a compute node 128 fails due to software error, network problems, or other issues, application workload scheduler 126 is able to adjust its scheduling of the application workload accordingly. For example, application workload scheduler 126 may mark failed compute VMs as "unavailable" for accepting tasks, and modify placement of subsequent tasks to other slots in same nodes or other nodes based on the reduced amount of available resources.

While the embodiment shown in FIG. 1 depicts one example architecture of a Hadoop application configured to process a large set of data using a distributed set of nodes, it should be recognized that alternative architectures, such as YARN (Yet Another Resource Negotiator) and other MapReduce-related architectures, may be utilized with the techniques described herein. It should be further recognized that, while embodiments of present disclosure are described in terms of a Hadoop installation, other distributed computing applications may be configured and utilized according to the techniques provided herein.

As described earlier, distributed computing application 124 may use a distributed filesystem 130, such as HDFS, configured to store and access data files in a distributed manner across nodes, referred to herein as data nodes 136. A file stored in distributed filesystem 130 is split into one or more data blocks, and the data blocks are stored in a set of data nodes 136. Each data node 136 may use and manage a data store in local storage 206 of the host on which each data node 136 is executing or in networked storage 230 accessible to the host on which each data node 136 is executing to store data blocks used by distributed computing application 124. In one embodiment, distributed filesystem 130 includes a name node 132 configured to track where data is located within storage resources of hosts 108 (e.g., local storage 206 and networked storage 230) and determine mappings of data blocks to data nodes 136. Data nodes 136 may be configured to serve read and write requests from clients of distributed filesystem 130, including distributed computing applications 124 and distributed database application 140. Data nodes 136 may be further configured to perform block creation, deletion, and replication, upon instruction from name node 308.

Elastic Temp Filesystem for Temporary Data

As discussed above, apart from the reads/writes of persistent data to HDFS, over the course of a Hadoop job, each task (e.g., performed by a compute node) may utilize temporary storage (interchangeably referred to as "temp space") for saving any intermediate results. The amount of temporary storage needed by a node may be dependent on the job being executed, and may vary widely. Some jobs may need little to no temp space, such as compute-only jobs; some jobs may require a constant amount of temp space, and while yet other jobs could require temp space that is a multiple of the input dataset. As an example, a map/reduce-based sorting job such as TeraSort may require temporary storage as much as twice the amount of the HDFS data the job operates on, while a map/reduce-based application "Pi" that computes digits of the mathematical constant π might not use any temporary storage at all. As such, with no reliable way to tell a priori how much temporary space will be needed, there are challenges to efficiently managing the available computing resources to support jobs running on the Hadoop framework.

The storage allocated during Hadoop cluster deployment can be shared between HDFS and temporary data, or in other cases, the HDFS and temporary data can be stored on dedicated drives. Although the Hadoop framework may not impose any architectural constraints, using a shared space advantageously reduces the need to overprovision storage for temp space, which can lead to storage inefficiencies. In a native physical environment, where compute and data nodes are combined (e.g., running on the same node), having HDFS and temp space on the same file system (e.g., ext3/ext4 file system) may achieve this goal. In this case, the file system is then responsible for allocating and reclaiming storage blocks as files are created and deleted, thus efficiently sharing space between the two types of Hadoop data files (i.e., HDFS, temp space).

However, when separating the compute nodes from the data nodes (i.e., executing in separate VMs 112) in a virtual environment, as shown in FIG. 1, one way to provide the tasks running in the compute VMs with temporary storage space is to attach a virtual disk (e.g., as embodied by a virtual machine disk file, or VMDK) directly to the VM. Though this may provide strong performance since the VMs have direct access to storage via I/O virtualization layer 232 (e.g., VMkernel vSCSI layer), this approach may suffer from the disadvantage of having to pre-allocate storage resources for both temp space and HDFS as mentioned above. The problem may be more acute when designing an elastic Hadoop framework, where compute nodes and data nodes may be dynamically allocated and de-allocated based on the current workload(s). First, while just-in-time provisioning of a new VM 112 (boot disk cloning, vCPU and memory allocation) can be relatively quick, provisioning independent virtual disks (i.e., VMDKs) for temp space may be more challenging. A virtual disk for temp space could be rapidly provisioned by using a "sparse" disk format, but that comes at a cost of runtime performance. Provisioning a "thick" disk format, on the other hand, might provide better runtime performance, but is time consuming (not to mention antithetical to the rapid, on-demand response of an elastic Hadoop framework.) In another alternative approach, VMs 112 could be pre-provisioned (i.e., with virtual disks for temp space already provisioned) and powered on and off based on demand. However, in this approach, in the powered-off state, the VMs would unnecessarily consume storage space.

In another approach, rather than use locally attached storage for temp space, data nodes may be configured to export NFS shares that are mounted by the compute VMs for temp space. According to this embodiment, network traffic of the NFS share would be relayed over a virtual switch (i.e., "vSwitch") within hypervisor 116, which would not be restricted by physical link limitations. Further, since a data node hosts both HDFS and temp data, storage provisioning may behave similar to that of the combined mode where the same file system (e.g., ext3/ext4) hosts and manages the files. However, under this approach, although traffic between data nodes and compute VMs on the same host might not go through the full physical network stack, the virtual network I/O mentioned above consumes a large amount of CPU resources, which takes reduces the amount of CPU resources that would otherwise be used for processing jobs on the compute VMs.

Accordingly, embodiment of the present disclosure provide a system that redirects accesses to virtual disks storing temp data in compute VMs to a common pool file, such as a VMFS file. As such, embodiments described herein provide performance and storage efficiency at least on par with local, direct attached virtual disks (e.g., VMDKs), while providing a single pool of shared storage that is provisioned and managed independently of the VMs. Further, embodiments described herein provide storage isolation between VMs storing temp data in that shared pool. Also, storage space for temp data may be allocated on demand and reclaimed when no longer needed, thereby supporting the wide variety of temp space requirements for different Hadoop jobs.

Figure 3:
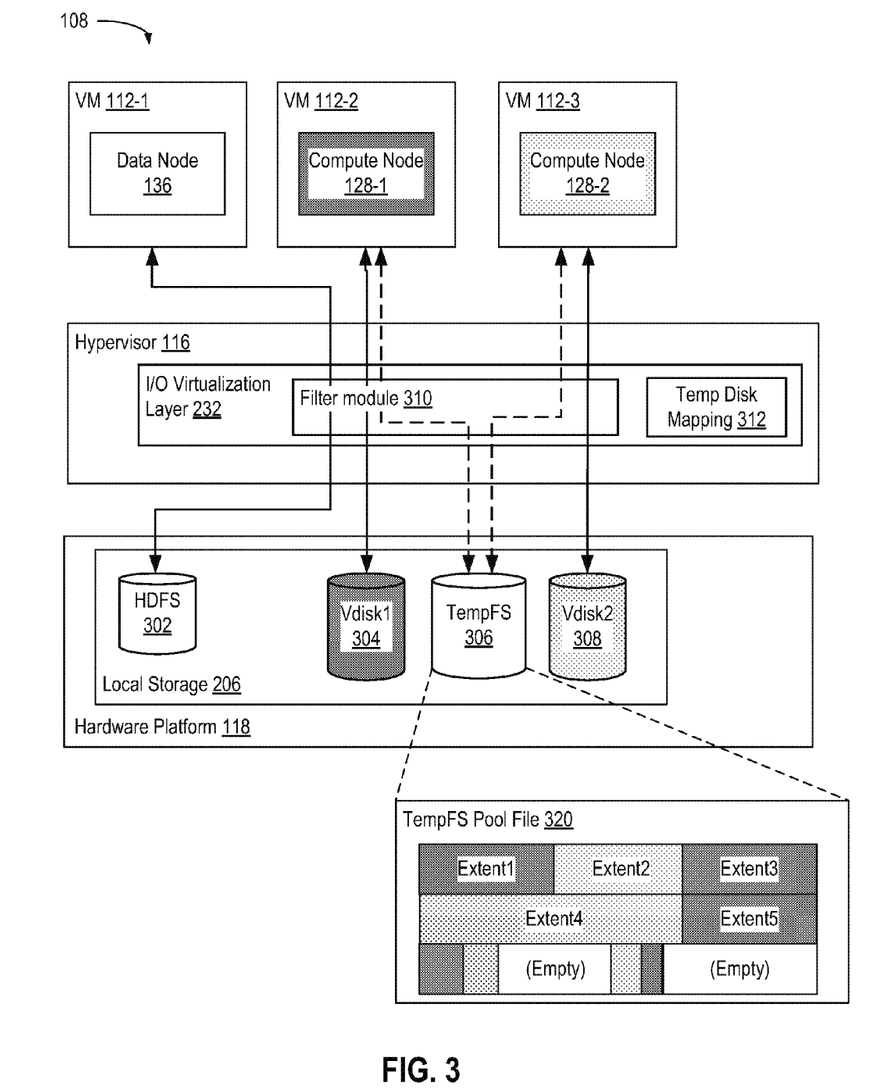
FIG. 3 is a block diagram depicting a system for providing shared temporary storage, according to one embodiment of the present disclosure.

FIG. 3 is a block diagram depicting a system for providing shared temporary storage, according to one embodiment of the present disclosure. As shown in FIG. 3, host 108 includes one or more compute VMs (e.g., 112-2, 112-3) that support execution of compute nodes (e.g., 128-1, 128-2), as well as, a data VM 112-1 that supports a data node 136. In the embodiment shown, at least one compute node and one data node are executing on the same physical host to maintain compute-data locality, for cases where the compute node needs to retrieve HDFS data via the data node. As depicted in FIG. 3, compute VMs 112-2, 112-3 that share a common temp space, as described below, are executing on the same host, allowing for performance and storage efficiency comparably to locally attached temp space in physical deployments.

In one embodiment, each compute VM has one or more "temp" virtual disks 306 whose accesses go through the filter module 310 of the I/O virtualization layer 232. The filter module 310 is configured to redirect all accesses to virtual disks designated for storing temp data in compute VMs to a common pool file 320. In one implementation, common pool file 320 may be a VMFS file accessible to the compute VMs. As shown in FIG. 3, pool file 320 includes a plurality of extents that are allocated to compute VMs for use in storing temp data (although other types of data may be used). For sake of illustration, extents associated with a particular VM are shaded in like patterns. For example, pool file 320 includes extents identified as Extent1, Extent3, Extent5, and other smaller extents (unlabeled) that are allocated to compute node 128-1 (dark pattern), while extents identified as Extent2 and Extent4 are other smaller extents are allocated to compute node 128-2 (lighter pattern). It should be recognized that the pool file may include portions of unallocated space between allocated extents.

During operation, distributed computing application 124 may instantiate one or more compute VMs in response to a workload or incoming job, e.g., to scale up the compute cluster. Each instantiated compute VM may be configured to specify which pool file will back the accesses of each "temp" virtual disk 306. In some embodiments, a VM configuration file, sometimes referred to as a "vmx" file, associated with a compute VM is modified to specify a particular pool file is associated with the temp virtual disk. For example, the configuration file associated with a compute VM 112-2 may specify a first virtual disk 304 (containing base image, such as guest OS, applications, etc.) which is backed by a corresponding VMDK in physical storage. Further, the configuration file may further specify a temp virtual disk 306, however, temp virtual disk 306 might not be backed by a corresponding, dedicated VMDK as with virtual disk 304. Rather, the configuration file effectively specifies a "placeholder" virtual disk having placeholder values (e.g., size, type, geometry), and then specifies a filter associated with the placeholder virtual disk. The filter, described further below, may include logic that intercepts I/O commands intended for that placeholder virtual disk and instead accesses pool file 320 as described herein. In one implementation, the configuration file may include a "filters" parameter that specifies the appropriate tempFS filter to be used, for example, SCSI % d.% d.filters=tempFS. In some implementations, a placeholder file, such as a file descriptor, may be generated that specifies the geometry and other metadata of the temp virtual disk. Accordingly, from the perspective of the compute node, the temp virtual disk behaves as if a locally attached storage (e.g., with its own file directory, etc.).

In one embodiment, the temp virtual disk is configured to zero out the contents of the temp virtual disk whenever the associated VM is booted (or powered off). This temporary semantic means filter module 310 of I/O virtualization layer 232 need not persist any of its mapping information to disk (unless needed for overflow), since all temp virtual disks would be zeroed out if, e.g., the VM shuts down, the VM reboots, entire physical host crashes, etc. As temp virtual disk may be zeroed on every VM boot, guest OS 216 is configured to re-make the temp filesystems (e.g., ext4) on each boot. For example, guest OS 216 may be configured to set up and format temp virtual disk 306.

In one embodiment, for a particular temp virtual disk 306, filter module 310 tracks all writes to temp virtual disk 306 and maintains a list or mapping 312 of all contiguous extents that have been written so far to temp virtual disk 306. Each time a new extent of the temp virtual disk is written, filter module 310 automatically chooses a location in the pool file at which point this extent can be stored. In one embodiment, filter module 310 maintains mapping 312 largely in memory (with possible overflow to disk, if necessary), so that all later accesses to the same extent can be efficiently and quickly mapped to the right location in the pool file. As mentioned above, all extents associated with a particular VM are automatically de-allocated from the pool file whenever that particular VM is powered off, thereby reclaiming temp space for other compute VMs.

In one embodiment, compute VMs may be configured to provide an indication to hypervisor 116 when files are removed from the temp virtual disk. In some embodiments, the compute VMs may transmit (e.g., via API call) a "TRIM" or "UNMAP" command and other information that indicates a particular portion of the temp virtual disk has been deleted, i.e., and is no longer needed. In one implementation, guest OS 216 may include a filesystem configured to send down a TRIM command whenever a file in the filesystem (e.g., ext4) is removed. Then filter module 310 can de-allocate that extent from the pool file, allowing the pool space to be used in a dynamic fashion.

As described above, during operation, distributed computing application 124 may scale down one or more compute VMs, for example, in response to resource contention). In such a case, during shutdown (or destruction) of a particular compute VM, the filter associated with temp virtual disk 306 may be configured to detect the shutdown (e.g., via a shutdown hook) and explicitly de-allocate all extents allocated to that compute VM in pool file 320. Accordingly, storage space which was used for temporary, ephemeral data may be re-claimed and re-allocated for use by other compute VMs.

While FIG. 3 depicts one common pool file 320 for sharing temp space among compute nodes, it should be recognized that multiple temp virtual disks may be used. For example, a compute node may have access to multiple temp virtual disks (e.g., with different usage patterns), which are then backed by corresponding separate pool files. Furthermore, rather than a single pool file 320 backing the shared temp space, in some alternative embodiments, multiple physical files may be used to back the shared temp space, for example, in cases where storage space and I/O are load-balanced between the multiple physical backings. Furthermore, while FIG. 3 depicts common pool file 320 stored in local storage 206, it should be recognized that the common pool file 320 may be stored in other storage systems, such as networked storage 230.

Figure 4:
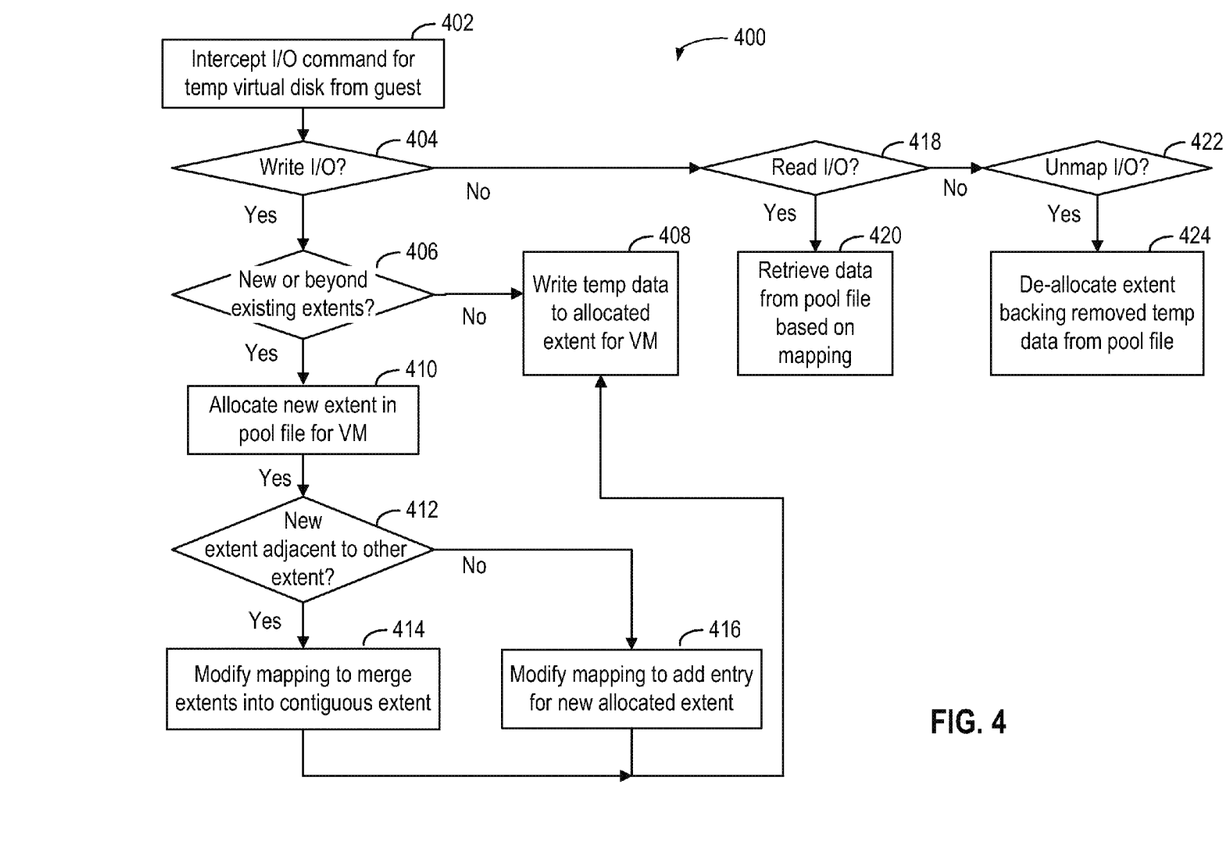
FIG. 4 is a flow diagram that illustrates steps for a method of providing temporary storage for a distributed computing application in a virtualized environment, according to an embodiment of the present disclosure.

FIG. 4 is a flow diagram that illustrates steps for a method 400 of providing temporary storage for a distributed computing application in a virtualized environment, according to an embodiment of the present disclosure. It should be recognized that, even though the method is described in conjunction with the system of FIGS. 1-3, any system configured to perform the method steps is within the scope of embodiments of the disclosure. For example, rather than the described method being embodied in filter logic that extends functionality of and is performed by a filter module within the I/O virtualization layer, the hypervisor itself may be modified to perform the described method. Furthermore, it should be further recognized that the method described herein is not limited to compute VMs in a distributed computing application, but may be applied to a variety of VMs having other configurations where temporary storage space is needed.

Method 400 begins at step 402, where filter module 310 of hypervisor 116 intercepts an I/O command targeting the temp virtual disk from one of the compute VMs. In one embodiment, filter module 310 determines the I/O command is for the temp virtual disk and applies filter logic for handling the I/O command, while allowing other I/O commands (e.g., for other virtual disks 304, or HDFS storage 302) to be handled normally.

At step 404, filter module 310 determines whether the intercepted I/O command is a write operation to the temp virtual disk. For example, the I/O command may be a write operation to write temporary data (e.g., intermediate Map output) to a logical block of the temp virtual disk.

If so, at step 406, filter module 310 determines whether the write I/O is to be performed on temp space for the compute VM that has a corresponding extent already allocated from the pool file, or if the write command is to a new extent or is beyond existing extents. In some embodiments, filter module 310 determines if the write command is for an already allocated extent based on whether the logical block specified by the I/O command has a corresponding extent already allocated from the pool file.

Responsive to determining the write command is to an existing extent, at step 408, I/O virtualization layer 232 proceeds to write the temp data to the allocated extent associated with the VM.

Responsive to determining the write command is for an unallocated extent, at step 410, I/O virtualization layer 232 allocates a new extent in the pool file for the compute VM. The new extent may be allocated from the pool file using various allocation policies configured to increase storage efficiency and performance. In one example allocation policy, for a new extent started with a write having a threshold size or larger (e.g., 256 Kb or larger), I/O virtualization layer 232 allocates a physical region in the pool file having one size (e.g., a 16 MB chunk). Further according to this policy, for extents starting with a write having a size smaller than the threshold size (e.g., less than 256 Kb writes), I/O virtualization layer 232 allocates in a "small file" region of the pool file. Since writes of large files in a Hadoop framework (e.g., HDFS and temp data) at the virtual SCSI level are generally 512 Kb (which, in some cases, is largest size available under SCSI), the described allocation policy is configured to presume that an extent starting with a write larger than the threshold size (e.g., 256 Kb) is likely for a large file, and seeks to ensure the extent is contiguous at least in certain predetermined chunk sizes (e.g., 16 MB chunks). As such, the described allocation policy allocates chunks in sizes selected to reduces overhead (time and cost) because allocation of new extents need not be performed for every small write I/O, and the larger granularity of extents reduces the amount of metadata space needed for the temp disk mapping. It should be recognized that other chunk and threshold sizes, as well as other allocation policies may be used.

At step 412, filter module 310 determines the newly allocated extent is adjacent to another extent associated with the same compute VM. If so, at step 414, filter module 310 merges the extents and modifies temp disk mapping 312 to view the merged extent as a single contiguous extent. This reduces the number of extents the mapping needs to keep track of. In one embodiment, the filter module updates the existing entry in the mapping to specify a contiguous extent having a size, location, and/or address of the merged extents. For example, FIG. 3 depicts pool file 320 having a merged extent identified as "Extent3" which is allocated to compute VM 112-3, having a size of two chunks. I/O virtualization layer 232 proceeds to step 408, and writes the temp data to the (newly) allocated extent as instructed by the write I/O command and based on the mapping.

Otherwise, at step 416, filter module 310 modifies the temp disk mapping by adding a new entry for the newly allocated extent. In one embodiment, each entry in the mapping may specify an identity of the compute VM associated with the extent, the location in the pool file to which the extent maps, and other metadata, such as extent size (e.g., in sectors, in bytes). I/O virtualization layer 232 proceeds to step 408, and writes the temp data to the (newly) allocated extent as instructed by the write I/O command and based on the mapping.

If not a write I/O command, at step 418, filter module 310 determines whether the intercepted I/O command is a read I/O command. If so, at step 420, filter module 310 retrieves temp data from the pool file based on the mapping. In one embodiment, filter module 310 determines the location in the pool file at which the requested extent is stored based on temp disk mapping 312 and retrieves the requested data. In one or more embodiments, the pool file may be configured such that different VMs sharing the common storage pool are not able to access each other's data. For example, filter module 310 may check whether the requesting guest VM is associated with the requested portion of the pool file based on mapping 312, and return temp data if the portion of the pool file is associated with requesting guest VM. As such, filter module 310 provides data separation in the pool file even thought multiple VMs share a common storage pool.

If not a read I/O command, at step 422, filter module 310 determines whether the interception I/O command is an unmap I/O command, interchangeably referred to as a trim command, which indicates when a block(s) in the temp virtual disk has been removed (due to file deletion or truncation). In some embodiments, the filesystem of the guest (e.g., compute VM) may be configured to issue an unmap command for the blocks of a file whenever the guest OS deletes (or truncates) that file from the temp virtual disk. Responsive to intercepting an unmap command indicating a block has been removed, at step 424, the filter module determines the extent backing that block based on temp disk mapping 312, and de-allocates the extent from the pool file. Accordingly, while conventional sparsely virtual disks might continually grow larger and larger, embodiments of the present disclosure are configured to free up temp space from the shared pool space by reclaiming storage from a guest based on indications from the guest that that temp data has been removed.

VM-to-VM Channels

According to one embodiment, communication between VMs may be via a mechanism herein referred to as vSockets, or sometimes referred to VMCISockets, or vsock. vSockets present a POSIX socket API that enables client applications to create network-less channels between VMs on the same physical host. It is exposed to user and kernel-mode through a new socket family, "AF_VSOCK". Addressing is done via a specialized structure, "struct sockaddr_vm", through which clients can specify contexts (i.e., VM identifiers, analogous to IP addresses) and ports. Socket calls to the vSockets may be performed according to known techniques for performing socket calls, for example, UDP and TCP sockets.

Rather than modify the Hadoop stack to use vSockets addressing, an interposer library may be inserted to hook the system socket calls via a LD_PRELOAD mechanism. A one-to-one mapping between IP and context is constructed for each VM, and the library uses this mapping to translate between INET and vSockets addresses.

In one embodiment, the underlying channel of communication for each vSocket is a shared ring buffer or queue into which data can be enqueued or dequeued. Queues are exposed to the guest as primitives via a para-virtual device (VMCI) that also offers mechanisms for signaling the hypervisor and receiving interrupts. Each queue has a header page, with a head and tail pointer, and a number of data pages. Each socket has two such queues to allow bi-directional transfer. Enqueuing involves a copy from the client-supplied buffer (for example, when Hadoop performs a send(2) socket call) and an update of the pointers on the header page. Dequeuing does the reverse, copying out of the queue into the client-supplied buffer. A simple form of flow-control, based on queue fullness, is used to determine when to signal the peer that data or space is available in the queue.

Intuitively, queues may be established directly between end-points for good performance. The pages of a queue between two VMs may be shared between those VMs, thereby allowing each side to read and write directly into its peer's memory. To avoid breaking VM isolation and maintain VM migration capabilities, these queues are implemented in pairs, with the hypervisor acting as a proxy in the middle.

In one embodiment, a queue is constructed between VM and hypervisor for each endpoint in a channel. For instance, to connect a socket between VMs A and B, one queue is established between A and the hypervisor, and a second queue between B and the hypervisor. Each queue is backed only by the pages of its owning VM. The queues are connected transparently by the hypervisor, which maps the pages backing both queues into the hypervisor's own address space. Isolation is thus ensured. This mapping is performed once at connection time and may be permanent, to avoid paying the cost for each data transfer.

In one embodiment, a trace is installed on the header page of each queue. As data is enqueued and dequeued by each endpoint of the socket, the head and tail pointers on the queue's header page are updated, causing the trace to be fired in the hypervisor. It can then copy from one queue to another, thereby spanning the gap between the VMs. In some embodiments, if the size of the transfer is less than a page, the copy is performed directly by the monitor. For larger transfers, the hypervisor (e.g., VMkernel) may perform the copy.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method comprising:
intercepting, by operation of an I/O virtualization layer, storage commands associated with a first virtual machine (VM) including a first storage command and a second storage command;
determining that the first storage command specifies a logical storage space of a first virtual disk, and upon determining that the first storage command specifies the logical storage space of the first virtual disk, executing the first storage command on the first virtual disk; and
determining that the second storage command specifies a logical storage space of a temporary virtual disk, which is a persistent storage, wherein data of the temporary virtual disk are stored in a pool file, which is a shared file in a file system that is accessible by a plurality of virtual machines including the first virtual machine, and upon determining that the second storage command specifies the logical storage space of the temporary virtual disk, determining a location of an extent corresponding to the logical storage space of the temporary virtual disk within the pool file based on a mapping, which comprises a list of extents within the pool file that have been written to and locations of the extents within the pool file, the extents within the pool file being associated with the plurality of virtual machines, and executing the second storage command on the extent at the determined location within the pool file.

2. The method of claim 1, wherein executing the second storage command on the extent at the determined location within the pool file comprises:
executing a write operation of temporary data to the extent corresponding to the logical storage space of the temporary virtual disk.

3. The method of claim 1, wherein executing the second storage command on the extent at the determined location within the pool file comprises:
executing a read operation of temporary data from the extent corresponding to the logical storage space of the temporary virtual disk.

4. The method of claim 1, wherein the second storage command comprises an unmap operation indicating temporary data contained in the logical storage space is no longer needed, and executing the second storage command on the extent at the determined location within the pool file comprises de-allocating the extent corresponding to the logical storage space of the temporary virtual disk.

5. The method of claim 1, further comprising:
responsive to powering off the first VM, de-allocating a plurality of extents associated with the first VM from the pool file.

6. The method of claim 1, wherein the storage commands associated with the first VM includes a third storage command that comprises a write operation of temporary data to a logical storage space of the temporary virtual disk and the method further comprises:
determining that no extent within the pool file corresponds to the logical storage space of the temporary virtual disk specified in the third storage command; and
upon determining that no extent within the pool file corresponds to the logical storage space of the temporary virtual disk specified in the third storage command, allocating a new extent from the pool file, updating the mapping to add the new extent and a location of the new extent within the pool file, and writing the temporary data to the new extent based on the updated mapping.

7. The method of claim 6, further comprising:
determining that the new extent is located within the pool file adjacent to an existing extent associated with the first VM; and
updating the mapping to replace the new extent and the existing extent with a single contiguous extent within the pool file.

8. The method of claim 6, wherein the allocating the new extent from the pool file comprises:
responsive to determining that a size of the temporary data of the write operation exceeds a threshold size, allocating the new extent having a first size; and
responsive to determining that the size of the temporary data of the write operation does not exceed the threshold size, allocating the new extent having a second size.

9. A non-transitory computer-readable storage medium comprising instructions that, when executed in a computing device, perform a method of:
intercepting, by operation of an I/O virtualization layer, a storage command associated with a first virtual machine (VM) including a first storage command and a second storage command;
determining that the first storage command specifies a logical storage space of a first virtual disk, and upon determining that the first storage command specifies the logical storage space of the first virtual disk, executing the first storage command on the first virtual disk; and
determining that the second storage command specifies a logical storage space of a temporary virtual disk, which is a persistent storage, wherein data of the temporary virtual disk are stored in a pool file, which is a shared file in a file system that is accessible by a plurality of virtual machines including the first virtual machine, and upon determining that the second storage command specifies the logical storage space of the temporary virtual disk, determining a location of an extent corresponding to the logical storage space of the temporary virtual disk within the pool file based on a mapping, which comprises a list of extents within the pool file that have been written to and locations of the extents within the pool file, the extents within the pool file being associated with the plurality of virtual machines, and executing the second storage command on the extent at the determined location within the pool file.

10. The non-transitory computer-readable storage medium of claim 9, wherein executing the second storage command on the extent at the determined location within the pool file comprises: executing a write operation of temporary data to the extent corresponding to the logical storage space of the temporary virtual disk.

11. The non-transitory computer-readable storage medium of claim 9, wherein executing the second storage command on the extent at the determined location within the pool file comprises: executing a read operation of temporary data from the extent corresponding to the logical storage space of the temporary virtual disk.

12. The non-transitory computer-readable storage medium of claim 9, wherein the second storage command comprises an unmap operation indicating temporary data contained in the logical storage space is no longer needed, and executing the second storage command on the extent at the determined location within the pool file comprises de-allocating the extent corresponding to the logical storage space of the temporary virtual disk.

13. The non-transitory computer-readable storage medium of claim 9, wherein the method further comprises:
responsive to powering off the first VM, de-allocating a plurality of extents associated with the first VM from the pool file.

14. The non-transitory computer-readable storage medium of claim 9, wherein the storage command associated with the first VM includes a third storage command that comprises a write operation of temporary data to a logical storage space of the temporary virtual disk and the method further comprises:
determining that no extent within the pool file corresponds to the logical storage space of the temporary virtual disk specified in the third storage command; and
upon determining that no extent within the pool file corresponds to the logical storage space of the temporary virtual disk specified in the third storage command, allocating a new extent from the pool file, updating the mapping to add the new extent and a location of the new extent within the pool file, and writing the temporary data to the new extent based on the updated mapping.

15. The non-transitory computer-readable storage medium of claim 14, wherein the method further comprises:
determining that the new extent is located within the pool file adjacent to an existing extent associated with the first VM; and
updating the mapping to replace the new extent and the existing extent with a single contiguous extent within the pool file.

16. The non-transitory computer-readable storage medium of claim 14, wherein the allocating the new extent from the pool file comprises:
responsive to determining that a size of the temporary data of the write operation exceeds a threshold size, allocating the new extent having a first size; and
responsive to determining that the size of the temporary data of the write operation does not exceed the threshold size, allocating the new extent having a second size.

17. A computer system comprising:
a storage device having a pool file comprising a first plurality of extents associated with a first virtual machine (VM) and a second plurality of extents associated with a second VM;
a system memory having a mapping of the first and second plurality of extents that have been written to locations within the pool file; and
a processor configured to:
intercept a storage command associated with the first VM, wherein the storage command specifies a logical storage space of a virtual disk, wherein the virtual disk is one of a first virtual disk and a temporary virtual disk, which is a persistent storage, and wherein data of the temporary virtual disk are stored in the pool file, which is a shared file in a file system that is accessible by a plurality of virtual machines including the first virtual machine;
if the storage command specifies the logical storage space of the first virtual disk, execute the storage command on the first virtual disk; and
if the storage command specifies the logical storage space of the temporary virtual disk, determine whether a first extent of the first plurality of extents corresponding to the logical storage space of the temporary virtual disk is present within the pool file based on the mapping, and if the first extent is determined to be present within the pool file, determine a location of the first extent within the pool file based on the mapping and execute the storage command on the first extent at the determined location within the pool file.

18. The computer system of claim 17, wherein the processor is configured to execute the storage command on the first extent at the determined location within the pool file by: executing a write operation of temporary data to the first extent corresponding to the logical storage space of the temporary virtual disk.

19. The computer system of claim 17, wherein the storage command comprises a write operation of temporary data to the logical storage space of the temporary virtual disk, and the processor is further configured to:
- responsive to determining no extent within the pool file corresponds to the logical storage space of the temporary virtual disk, allocate a new extent from the pool file;
- update the mapping to add the new extent and a location of the new extent within the pool file; and
- write the temporary data to the new extent based on the updated mapping.

20. The computer system of claim 17, wherein the storage command comprises an unmap operation indicating temporary data contained in the logical storage space has been removed, and the processor is configured to execute the storage command on the first extent at the determined location within the pool file by de-allocating the first extent corresponding to the logical storage space of the temporary virtual disk.

* * * * *